United States Patent
Deng et al.

(10) Patent No.: US 11,974,200 B2
(45) Date of Patent: Apr. 30, 2024

(54) INDOOR POSITIONING METHOD AND ELECTRONIC DEVICE

(71) Applicant: BOE Technology Group Co., Ltd., Beijing (CN)

(72) Inventors: Wei Deng, Beijing (CN); Hongtao Guan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 353 days.

(21) Appl. No.: 17/431,629

(22) PCT Filed: Feb. 3, 2021

(86) PCT No.: PCT/CN2021/075026
§ 371 (c)(1),
(2) Date: Aug. 17, 2021

(87) PCT Pub. No.: WO2021/164548
PCT Pub. Date: Aug. 26, 2021

(65) Prior Publication Data
US 2022/0103983 A1    Mar. 31, 2022

(30) Foreign Application Priority Data

Feb. 17, 2020 (CN) .......................... 202010097560.9

(51) Int. Cl.
*H04W 4/33* (2018.01)
*H04W 4/38* (2018.01)
*H04W 4/80* (2018.01)

(52) U.S. Cl.
CPC ............... *H04W 4/33* (2018.02); *H04W 4/38* (2018.02); *H04W 4/80* (2018.02)

(58) Field of Classification Search
CPC ............ H04W 4/33; H04W 4/38; H04W 4/80
USPC ........................................................ 455/456.3
See application file for complete search history.

(56) References Cited

U.S. PATENT DOCUMENTS

| | | | |
|---|---|---|---|
| 2018/0077546 A1* | 3/2018 | Arunachalam | ........ G01S 5/0295 |
| 2018/0088208 A1 | 3/2018 | Gagrani et al. | |
| 2018/0322454 A1* | 11/2018 | Komoni | ................... H04Q 9/00 |
| 2019/0066036 A1 | 2/2019 | Roisen et al. | |

(Continued)

FOREIGN PATENT DOCUMENTS

| | | |
|---|---|---|
| CN | 103945530 A | 7/2014 |
| CN | 104750224 A | 7/2015 |
| CN | 206557388 U | 10/2017 |

(Continued)

OTHER PUBLICATIONS

CN 2020100975609 first office action.
PCT /CN2021/075026 international search report and written opinion.

*Primary Examiner* — Ted M Wang
(74) *Attorney, Agent, or Firm* — IPro, PLLC

(57) ABSTRACT

The present disclosure provides an indoor positioning method and an electronic device. The method includes: determining a current state of an electronic device according to a current speed parameter of a sensor; if it is determined that the electronic device is currently in a motion state, turning on a Bluetooth positioning circuit in the electronic device; determining a current location of the electronic device according to positioning beacon information obtained by the Bluetooth positioning circuit.

19 Claims, 5 Drawing Sheets

(56) References Cited

U.S. PATENT DOCUMENTS

2019/0130137 A1    5/2019   Roux
2020/0226075 A1    7/2020   Yan

FOREIGN PATENT DOCUMENTS

| CN | 107367743 A | 11/2017 |
| CN | 109163725 A | 1/2019 |
| CN | 109600830 A | 4/2019 |
| CN | 208821097 U | 5/2019 |
| CN | 110012433 A | 7/2019 |
| CN | 111314870 A | 6/2020 |

* cited by examiner

INDOOR POSITIONING METHOD AND ELECTRONIC DEVICE

CROSS-REFERENCE TO RELATED APPLICATION

The present application is the U.S. national phase of PCT Application No. PCT/CN2020/075026 filed on Feb. 3, 2021, which claims a priority of the Chinese patent application No. 202010097560.9 filed on Feb. 17, 2020, which is incorporated herein by reference in its entirety.

TECHNICAL FIELD

The present disclosure relates to the field of computer application technology, in particular to an indoor positioning method, an electronic device and a storage medium.

BACKGROUND

For outdoor environments, Global Navigation Satellite System (GNSS) such as the Global Positioning System (GPS) of United States and BeiDou Navigation Satellite System (BDS) of China can provide users with high-precision positioning services, which basically meet the user's needs for location-based services in outdoor scenes. However, in the indoor scene blocked by the building, the satellite signal is rapidly attenuated, the positioning requirements of the indoor scene cannot be met.

SUMMARY

In a first aspect, the present disclosure provides in some embodiments provides an indoor positioning method, includes: determining a current state of an electronic device according to a current speed parameter of a sensor; if it is determined that the electronic device is currently in a motion state, turning on a Bluetooth positioning circuit in the electronic device; determining a current location of the electronic device according to positioning beacon information obtained by the Bluetooth positioning circuit.

In a second aspect, the present disclosure provides in some embodiments provides an electronic device, includes: a sensor, a main control circuit and a Bluetooth positioning circuit, wherein the sensor is configured to determine a current speed parameter of the electronic device; the main control circuit is configured to determine a current state of the electronic device according to the current speed parameter; if it is determined that the electronic device is currently in a motion state, the Bluetooth positioning circuit is turned on; and the current location of the electronic device is determined according to positioning beacon information obtained by the Bluetooth positioning circuit.

In a third aspect, the present disclosure provides in some embodiments provides an electronic device, includes: a memory, a processor, and a program stored on the memory and executed by the processor, wherein the processor executes the program to implement the indoor positioning method.

In a fourth aspect, the present disclosure provides in some embodiments provides a computer-readable storage medium with a computer program stored thereon, wherein the computer program is executed by a processor to implement the indoor positioning method.

In a fifth aspect, the present disclosure provides in some embodiments provides a computer program executed by a processor to implement the indoor positioning method.

In a sixth aspect, the present disclosure provides in some embodiments provides a computer program product, comprising computer instructions that instruct a computing device to execute the indoor positioning method.

The additional aspects and advantages of the present disclosure will be provided and obvious in the following description.

BRIEF DESCRIPTION OF THE DRAWINGS

The above and/or additional aspects and advantages of the present disclosure will be obvious and easy to understand from the following description of the embodiments in conjunction with the accompanying drawings, in which.

DETAILED DESCRIPTION

Figure 1:
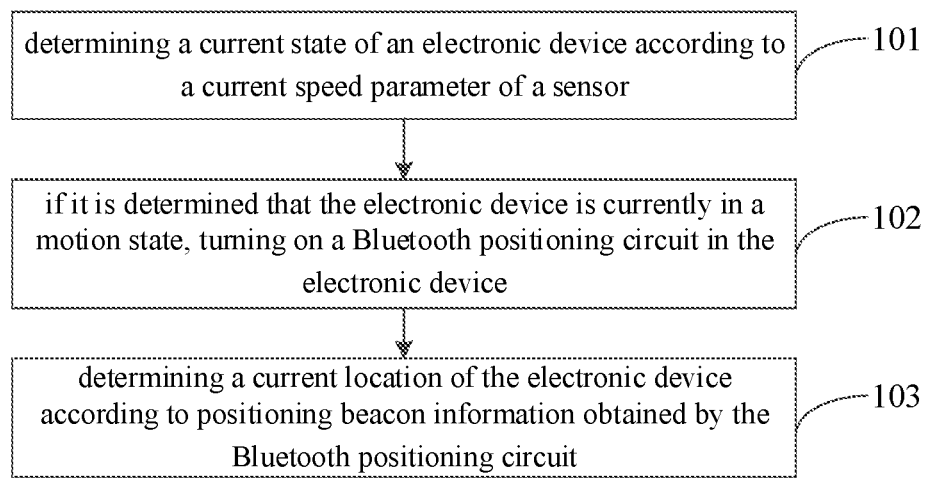
FIG. 1 is a schematic flowchart of an indoor positioning method provided by an embodiment of the present disclosure.

The embodiments of the present disclosure are described in detail below. Examples of the embodiments are shown in the accompanying drawings, in which the same or similar reference numerals indicate the same or similar elements throughout. The embodiments described below with reference to the drawings are exemplary, and are intended to explain the present disclosure, but should not be construed as limiting the present disclosure.

Among many indoor positioning technologies, the positioning method based on Received Signal Strength Indicator (RSSI) has been widely used due to its low hardware requirements and no need for time synchronization.

In the related art, an electronic device with a positioning function (such as an employee badge) can be used to perform indoor positioning of a person wearing the employee badge. Electronic devices based on RSSI indoor positioning technology generally scans indoor positioning beacons by setting a Bluetooth positioning circuit in the electronic device to achieve indoor positioning. However, due to the high power consumption of the Bluetooth positioning circuit when scanning the positioning beacon, the overall power consumption of the electronic device is increased, and the standby time of the electronic device is reduced.

The embodiments of the present disclosure provides an indoor positioning method to solve the problem of high power consumption when the Bluetooth positioning circuit scans the positioning beacon in the related art, thereby increasing the overall power consumption of the electronic device and reducing the standby time of the electronic device.

The indoor positioning method provided by the embodiments of the present disclosure determines the current state of the electronic device according to the current speed parameters of the sensor, and when it is determined that the electronic device is currently in a motion state, the Bluetooth positioning circuit in the electronic device is turned on, and then according to each positioning beacon information obtained by the Bluetooth positioning circuit, the current location of the electronic device is determined. Thus, by enabling the Bluetooth positioning circuit to scan the positioning beacon only when the electronic device is in a motion state, the power consumption of the Bluetooth positioning circuit is reduced and the standby time of the electronic device is improved.

The indoor positioning method, electronic device, storage medium, and computer program provided by the present disclosure will be described in detail below with reference to the accompanying drawings.

FIG. 1 is a schematic flowchart of an indoor positioning method provided by an embodiment of the present disclosure.

As shown in FIG. 1, the indoor positioning method includes the following steps.

Step 101: determining a current state of an electronic device according to a current speed parameter of a sensor.

The sensor may be a sensor that detects speed parameters such as acceleration and speed of the electronic device, such as an acceleration sensor, a gyroscope, etc., which are not limited in the embodiment of the present disclosure.

Among them, the current speed parameter of the sensor may include the current acceleration, speed and other parameters of the electronic device, but it is not limited to this. It should be noted that the parameter type included in the current speed parameters of the sensor is related to the type of the sensor.

Among them, the electronic device is currently in a motion state, which refers to a state in which an object has a moving speed relative to a certain reference system when the object is moving mechanically.

It should be noted that when the displacement of the electronic device is less than a preset threshold, it can be considered that the electronic device is in a stationary state. When the displacement of the electronic device is greater than or equal to the preset threshold, it can be considered that the electronic device is in a motion state.

It should be noted that the electronic devices in the embodiments of the present disclosure may include work cards such as electronic badges, mobile phones, tablet computers, personal digital assistants, wearable devices, etc., which are not limited in the embodiments of the present disclosure.

In indoor positioning scenarios, RSSI-based indoor positioning technology generally scans indoor positioning beacons by setting a Bluetooth positioning circuit in an electronic device. Because the Bluetooth positioning circuit has a high power consumption when scanning the positioning beacon, if the Bluetooth positioning circuit is always in the scanning state, the power consumption of the electronic device will be greatly increased, thereby reducing the standby time of the electronic device. However, since the electronic device does not need to be continuously positioned when the electronic device is in a stationary state, the Bluetooth positioning circuit can be turned off to reduce the power consumption of the electronic device. In other words, in the embodiments of the present disclosure, the on and off of the Bluetooth positioning circuit is controlled according to the state of the electronic device.

In the embodiments of the present disclosure, a sensor can be provided in the electronic device, and the acceleration, speed and other parameters of the electronic device can be obtained and output through the sensor, and then the current state of the electronic device can be determined according to the current speed parameter of the sensor.

As a possible implementation, the electronic device can also include a main control circuit (which can be a central processing unit, a micro-control unit, etc.), and the main control circuit can be connected to the sensor, so that the main control circuit can be used to obtain the current speed parameters of the sensor, and determine the current state of the electronic device according to the current speed parameters of the sensor.

Optionally, if the speed parameters of the sensor include acceleration and speed, an acceleration threshold and a speed threshold can be preset, so that when the current acceleration outputted by the sensor is less than or equal to the acceleration threshold, and the current speed outputted by the sensor is less than or equal to the speed threshold, it is determined that the electronic device is currently in stationary state. When the current acceleration outputted by the sensor is greater than the acceleration threshold, and/or the current speed outputted by the sensor is greater than the speed threshold, it is determined that the electronic device is currently in motion state.

Optionally, the current state of the electronic device can also be determined according to the displacement of the electronic device within a preset time period. Therefore, a displacement threshold can be preset, so that the displacement of the electronic device within the preset time period can be determined according to the acceleration and speed currently outputted by the sensor, and when the displacement of the electronic device within the preset time period is less than or equal to the displacement threshold, it is determined that the electronic device is currently in a stationary state; when the displacement of the electronic device within the preset time period is greater than the displacement threshold, it is determined that it is currently in a motion state.

It should be noted that the method of determining the current state may include but is not limited to the situations listed above. In actual use, the method of determining the current state and the specific values of the various thresholds can be selected according to actual needs, which is not limited in the embodiment of the present disclosure.

Step 102: If it is determined that the electronic device is currently in a motion state, turning on a Bluetooth positioning circuit in the electronic device.

In the embodiments of the present disclosure, if it is determined that the electronic device is currently in the motion state, the Bluetooth positioning circuit in the electronic device can be turned on through a main control circuit, so that during the movement of the electronic device, the Bluetooth positioning circuit is used to scan the positioning beacon set in the indoor scene, so as to realize real-time positioning of electronic device.

Further, the on and off of the Bluetooth positioning circuit can be controlled through a power supply loop of the Bluetooth positioning circuit. That is, in a possible implementation of the embodiment of the present disclosure, the foregoing step 102 may include: controlling a power supply loop of the Bluetooth positioning circuit in the electronic device to be connected.

As a possible implementation, the electronic device in the embodiment of the present disclosure may further include a power source, and the power source may supply power to other circuits in the electronic device. Among them, the power supply can be respectively connected with the sensor, the Bluetooth positioning circuit and the main control circuit to supply power to the sensor and the Bluetooth positioning circuit. When it is determined that the electronic device is currently in the motion state, the main control circuit can control the power supply loop of the Bluetooth positioning circuit to be connected, so that the power supply can supply power to the Bluetooth positioning circuit.

In a possible implementation of the embodiment of the present disclosure, the method may further include: after the Bluetooth positioning circuit is turned on for a second preset time period, disconnecting the power supply circuit of the sensor.

Optionally, after the Bluetooth positioning circuit is turned on, the sensor can be turned off to further save the power consumption of the electronic device. Here, the second preset time period is zero. That is, after turning on the Bluetooth positioning circuit, the sensor can be turned off immediately.

After turning on the Bluetooth positioning circuit to locate the electronic device, there is no need to use the sensor to detect the movement state of the electronic device temporarily, so that the power supply circuit of the sensor can be disconnected through the main control circuit to turn off the sensor and further reduce the power consumption of the electronic device.

Optionally, after the Bluetooth positioning circuit is turned on, since the power consumption of the sensor is small, at the microampere level, it is possible to keep the sensor and the Bluetooth positioning circuit are in the on state at the same time to avoid turning on and off the sensor frequently.

As a possible implementation, after the Bluetooth positioning circuit is turned on, the sensor can be kept in the on state at the same time as the Bluetooth positioning circuit for a short period of time (that is, the second preset time period is not zero), and when the electronic device is determined continuously in the motion state, the sensor is turned off. For example, within 2 seconds after turning on the Bluetooth positioning circuit, the sensor and the Bluetooth positioning circuit are kept turned on at the same time. If after 2 seconds, it is determined that the electronic device is still in the motion state, the sensor can be turned off, which not only saves power consumption, but also avoids determining the state of electronic device wrongly. Since the electronic device is in an unstable state when switching the state, the sensor and the Bluetooth positioning circuit are kept on at the same time, the state of the electronic device can be accurately determined based on the detection results of the sensor and the Bluetooth positioning circuit, so as to avoid determining the state of the electronic device wrongly.

Specifically, it can be determined whether the electronic device is continuously in the motion state based on the positioning beacon information obtained by the Bluetooth positioning circuit, so as to determine whether the sensor can be turned off.

That is, in a possible implementation of the embodiment of the present disclosure, after the Bluetooth positioning circuit is turned on for the second preset time period and before the power supply circuit of the sensor is disconnected, the method may further include: if any two sets of positioning beacon information in a plurality of sets of positioning beacon information continuously obtained by the Bluetooth positioning circuit within the second preset time period have at least one different positioning beacon information, determining that the electronic device is in a motion state, wherein each set of positioning beacon information includes a plurality of positioning beacon information.

In some embodiments, the electronic device may obtain a plurality of positioning beacon information at a certain moment, and the plurality of positioning beacon information included in each set of positioning beacon information may be the first N positioning beacons sorted in descending order of signal strength.

According to the N positioning beacon information with larger signal strength, it is possible to more accurately determine whether the electronic device is in the motion state. For example, the electronic device obtains the first three positioning beacon information in descending order of signal strength in the first set of positioning beacon information at the first moment: positioning beacon information A, positioning beacon information B, and positioning beacon information C. The first three positioning beacon information in descending order of signal strength in the second set of positioning beacon information at the second moment are: positioning beacon information A, positioning beacon information B, and positioning beacon information C. The first three positioning beacon information in descending order of signal strength in the third set of positioning beacon information at the third moment are: positioning beacon information B, positioning beacon information C, and positioning beacon information D. Since there is one different positioning beacon information between the first set of positioning beacon information and the third set of positioning beacon information, it can be determined that the electronic device is in the motion state within the second preset time period.

In the embodiment of the present disclosure, after the Bluetooth positioning circuit is turned on for the second preset time period, it can be determined whether the electronic device is in the motion state according to the plurality of sets of positioning beacon information continuously obtained by the Bluetooth positioning circuit within the second preset time period, in order to prevent the sensor from determining the state of the electronic device wrongly, for example, the situation that the electronic device being in the motion state only happens instantaneously. Among them, a plurality of sets of positioning beacon information are obtained by the Bluetooth positioning circuit at different times. If any two sets of positioning beacon information in the plurality of sets of positioning beacon information have at least one different positioning beacon information, it can be determined that the electronic device is in the motion state, so that the sensor is turned off, that is, the power supply loop of sensor is disconnected.

In some embodiments, after the Bluetooth positioning circuit is turned on for the second preset time period, disconnecting the power supply loop of the sensor includes: determining that the displacement of the electronic device in the second preset time period is greater than the displacement threshold according to each positioning beacon information, and determining that the electronic device is in a motion state; disconnecting the power supply loop of the sensor.

Specifically, it is also possible to determine whether the electronic device is in a motion state through the displacement of the electronic device within the second preset time period.

For example, if it is determined that the electronic device is at position A at the first time in the second preset time period according to the positioning beacon information, and at position B at the second time in the second preset time period, the distance between position B and position A is greater than the displacement threshold, it is determined that the electronic device is in the motion state. For the location determination of the electronic device, the following description is referred for details.

Step 103: determining a current location of the electronic device according to the positioning beacon information obtained by the Bluetooth positioning circuit.

Wherein, the positioning beacon information may include a beacon identifier and signal strength of the positioning beacon, but it is not limited to this.

In some embodiments, the beacon identifier of the positioning beacon may be the MAC address of the positioning beacon.

In some embodiments, the signal strength of the positioning beacon may be the RSSI of the positioning beacon at the electronic device.

In some embodiments, before step 103, the method further includes: selecting N reference positioning beacon information from each positioning beacon information according to the signal strength of each positioning beacon information obtained by the Bluetooth positioning circuit, where N is a positive integer.

In some embodiments, the selecting N reference positioning beacon information from each positioning beacon information according to the signal strength of each positioning beacon information obtained by the Bluetooth positioning circuit includes: sorting the positioning beacon information in descending order according to the signal strength in each positioning beacon information obtained by the Bluetooth positioning circuit; and determining first N positioning beacon information as the reference positioning beacon information.

In some embodiments, the Bluetooth positioning circuit can obtain the information of a large number of positioning beacons at a time, and the current location of the electronic device can be determined based on the information of a small number of positioning beacons. Therefore, the obtained positioning beacon information can be screened to reduce computational complexity.

In the embodiment of the present disclosure, the specific value of N can be determined according to actual needs, which is not limited in the embodiment of the present disclosure. For example, N can be 3, 6, etc. The current location of the electronic device can be determined through three positioning beacon information obtained by the Bluetooth positioning circuit, and the preset number can be three. Therefore, when the number of positioning beacon information obtained by the Bluetooth positioning circuit is greater than 3, the first three positioning beacon information in descending order of signal strength can be selected as the reference positioning beacon information according to the signal strength of each positioning beacon information. The reference positioning beacon information is used to determine the current location of the electronic device.

As a possible implementation, the main control circuit can determine the current location of the electronic device according to the beacon identifier and signal strength in each positioning beacon information obtained by the Bluetooth positioning circuit. That is, in a possible implementation of the embodiment of the present disclosure, the step 103 may include: determining a current relative position between the electronic device and the first N reference positioning beacons according to the beacon identifiers and signal strength in the first N reference positioning beacon information; and determining the current location of the electronic device according to the current relative position between the electronic device and the first N reference positioning beacons and indoor setting positions of the first N reference positioning beacons.

The relative position between the electronic device and the reference positioning beacon may be the distance between the electronic device and the reference positioning beacon.

In some embodiments, after the main control circuit determines the current location of the electronic device, it may also send the current location of the electronic device to a serving end. The serving end monitors or guides users of the electronic device according to the current location of the electronic device.

For example, when the electronic device is an employee badge, the serving end determines that the user of the employee badge will enter an area which is no authorized for the employee badge according to the current location of the employee badge, and the serving end can take corresponding measures, such as sounding an alarm or notifying relevant personnel to prevent the user from entering the area.

For another example, at an exhibition, the serving end determines that the exhibition entrance A is too crowded based on the locations of plurality of electronic devices, while the exhibition entrance B has fewer people, and the serving end can notify relevant personnel to guide them.

In the embodiment of the present disclosure, the Bluetooth positioning circuit can scan the reference positioning beacons set in the indoor scene at a certain frequency to obtain the Bluetooth signals transmitted by each reference positioning beacon, so that the main control circuit can respectively determine the location of the electronic device at each time according to the respective reference positioning beacon information obtained by the Bluetooth positioning circuit at each time.

As a possible implementation, since the signal emitted by the positioning beacon decays with the propagation distance, the signal strength of the positioning beacon obtained by the Bluetooth positioning circuit is negatively correlated with the distance between the positioning beacon and the electronic device. Therefore, the main control circuit can determine the distance between the electronic device and each reference positioning beacon according to the signal strength of each positioning beacon obtained by the Bluetooth positioning circuit and the signal strength attenuation characteristics of the positioning beacon, that is, the relative position between the electronic device and each reference positioning beacon.

After that, the indoor setting position of each reference positioning beacon can be determined according to the beacon identifier in each reference positioning beacon information, and then the current location of the electronic device is determined according to the relative position between the electronic device and each positioning beacon and the indoor setting of each positioning beacon.

In some embodiments, based on the beacon identifier of the positioning beacon, the location of the positioning beacon is determined on the geographic information system or Geo-Information system (GIS) map or an indoor distribution map containing the beacon identifier (such as MAC address) of the positioning beacon and the location information of the positioning beacon.

After obtaining the positions of the N reference positioning beacons, a certain algorithm, such as the centroid method, may be used to determine the current position of the electronic device according to the positions of the N reference positioning beacons.

In the embodiment of the present disclosure, the electronic device further includes a communication circuit. After determining the current location of the electronic device, the main control circuit can also send the current location of the electronic device to the serving end through the communication circuit.

In some embodiments, the communication circuit may be implemented by Long Range Radio (LoRa) technology, frequency-shift keying (FSK) or other wireless communication technologies.

In some embodiments, the serving end can determine the current location of the electronic device in the same manner as described above. For example, the serving end determines the location of the positioning beacon on the GIS map or the indoor distribution map containing the beacon identifier (such as MAC address) of the positioning beacon and the location information of the positioning beacon according to the beacon identifier of the positioning beacon. After obtaining the positions of the N reference positioning beacons, a certain algorithm, such as the centroid method, may be used to determine the current position of the electronic device according to the positions of the N reference positioning beacons.

The indoor positioning method provided by the embodiments of the present disclosure determines the current state of the electronic device according to the current speed parameters of the sensor, and when it is determined that the electronic device is currently in the motion state, the Bluetooth positioning circuit in the electronic device is turned on, and then the current location of the electronic device is determined according to the positioning beacon information obtained by the Bluetooth positioning circuit. Thus, by turning on the Bluetooth positioning circuit to scan the positioning beacon only when the electronic device is in the motion state, the power consumption of the Bluetooth positioning circuit is reduced and the standby time of the electronic device is improved.

In a possible implementation of the present disclosure, the main control circuit of the electronic device can also send the positioning beacon information obtained by Bluetooth to the serving end, so that the serving end can determine the current location of the electronic device according to the positioning beacon information obtained by the Bluetooth positioning circuit so as to reduce the calculation amount of the main control circuit of the electronic device and reduce the hardware requirements of the main control circuit.

The indoor positioning method provided by the embodiment of the present disclosure will be further described below with reference to FIG. 2.

Figure 2:
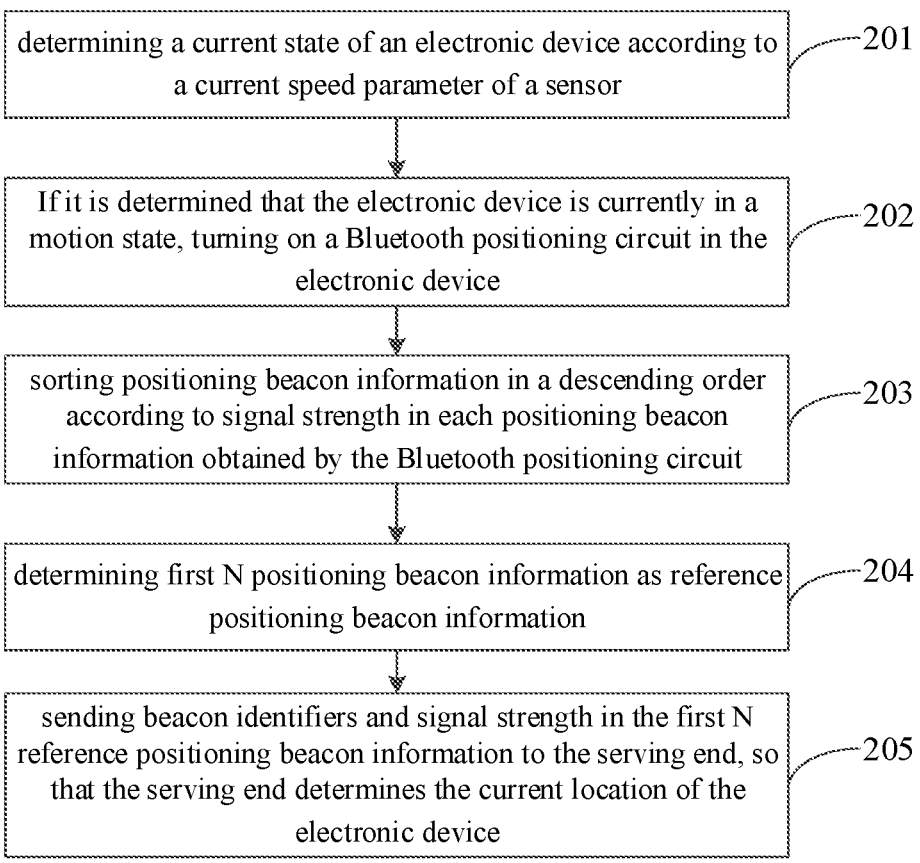
FIG. 2 is another schematic flowchart of an indoor positioning method provided by an embodiment of the present disclosure.

FIG. 2 is another schematic flowchart of an indoor positioning method provided by an embodiment of the disclosure.

As shown in FIG. 2, the indoor positioning method includes the following steps.

Step 201: determining a current state of an electronic device according to a current speed parameter of a sensor.

Step 202: If it is determined that the electronic device is currently in a motion state, turning on a Bluetooth positioning circuit in the electronic device.

For the specific implementation process and principles of the foregoing steps 201-202, reference may be made to the detailed description of the foregoing embodiment, which will not be repeated here.

Step 203: sorting positioning beacon information in a descending order according to signal strength in each positioning beacon information obtained by the Bluetooth positioning circuit.

Step 204: determining first N positioning beacon information as reference positioning beacon information.

As a possible implementation, according to the signal strength of each positioning beacon information obtained by the Bluetooth positioning circuit, a plurality of positioning beacon information with larger signal strength can be determined as the reference positioning beacon information. For example, three positioning beacon information with higher signal strength can be used as reference positioning beacon information.

In a possible implementation of the embodiments of the present disclosure, the hardware conditions of the main control circuit of some electronic devices may be low, do not have complex computing capabilities, or due to the consideration of reducing the size of the electronic device, it is impossible to provide a high-profile main control circuit. Therefore, in the embodiment of the present disclosure, the main control circuit of the electronic device may obtain the first N positioning beacon information obtained by the Bluetooth positioning circuit in descending order of signal strength, and then send the first N positioning beacon information in descending order of the signal strength to the serving end, and the serving end determines the current location of the electronic device.

Step 205: sending beacon identifiers and signal strength in the first N reference positioning beacon information to the serving end, so that the serving end determines the current location of the electronic device.

In the embodiment of the present disclosure, after determining the reference positioning beacon information, the main control circuit can send the reference positioning beacon information, that is, the reference beacon identifier to the serving end, so that the serving end can determine the relative position between the electronic device and each reference positioning beacon according to the signal strength in the reference positioning beacon information, and determine the current position of the electronic device according to the relative position between the electrical device and each reference positioning beacon and the indoor setting position of each reference positioning beacon.

It should be noted that the method of determining the current location of the electronic device through the serving end is the same as the method of determining the current location of the electronic device through the main control circuit in the foregoing embodiment, and will not be repeated here.

The indoor positioning method provided by the embodiments of the present disclosure calculates the current state of the electronic device according to the current speed parameters of the sensor, and when the electronic device is currently in the motion state, the Bluetooth positioning circuit in the electronic device is turned on, and then the positioning beacon information is sorted in descending order according to the signal strengths in each positioning beacon information obtained by the Bluetooth positioning circuit, the first N positioning beacon information is determined as the reference positioning beacon information, and then the beacon identifier and signal strength in the reference positioning beacon information are sent to the serving end, so that the serving end can determine the current location of the electronic device. Therefore, only when the electronic device is in the motion state, the Bluetooth positioning circuit is turned on to scan the positioning beacon, and the current location of the electronic device is determined through the serving end, which not only reduces the power consumption of the Bluetooth positioning circuit, but also improves the standby time of the electrical device, and the computational complexity and hardware requirements of the electronic device are reduced.

In a possible implementation of the present disclosure, when the electronic device is in the motion state, it can be monitored in real time whether the electronic device is in a stationary state according to the positioning beacon information obtained by the Bluetooth positioning circuit, so as to turn off the Bluetooth positioning circuit and turn on sensor for monitoring, the power consumption of electronic device is reduced.

The indoor positioning method provided by the embodiment of the present disclosure will be further described below in conjunction with FIG. 3.

Figure 3:
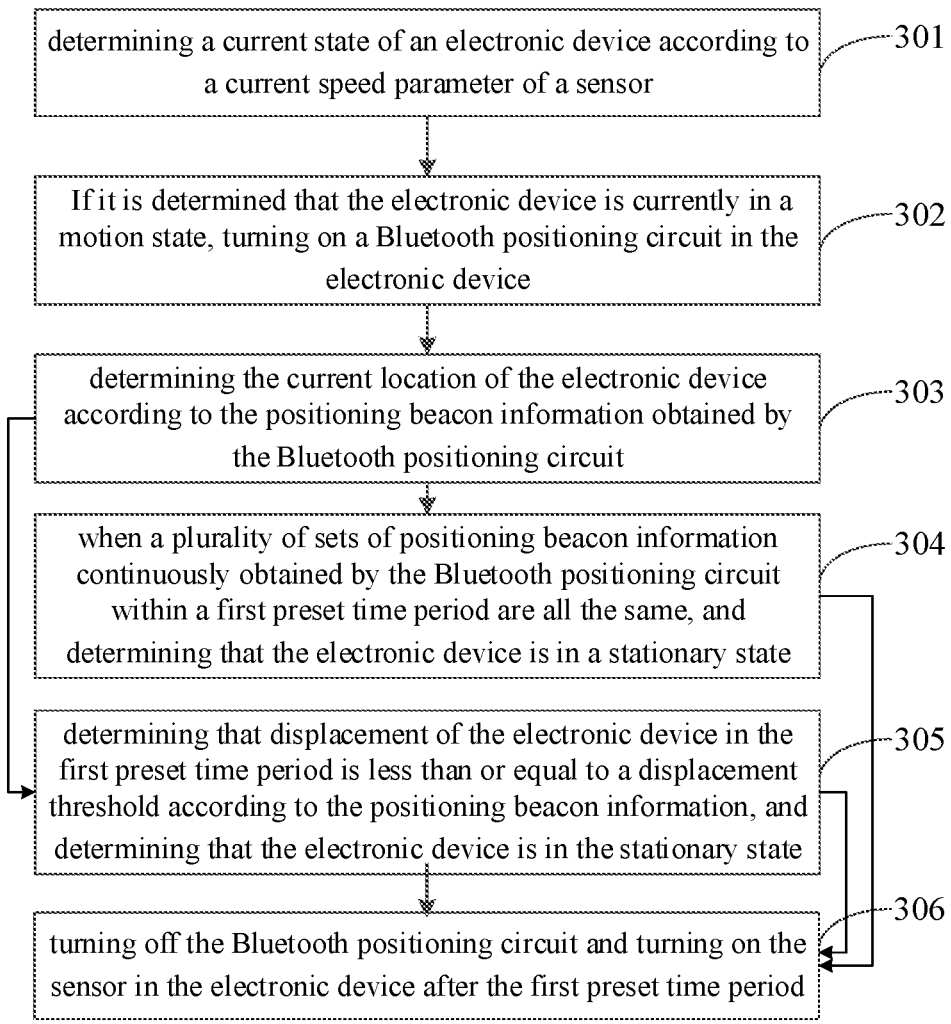
FIG. 3 is still another schematic flowchart of an indoor positioning method provided by an embodiment of the present disclosure.

FIG. 3 is yet another schematic flowchart of an indoor positioning method provided by an embodiment of the disclosure.

As shown in FIG. 3, the indoor positioning method includes the following steps.

Step 301: determining a current state of an electronic device according to a current speed parameter of a sensor.

Step 302: If it is determined that the electronic device is currently in a motion state, turning on a Bluetooth positioning circuit in the electronic device.

Step 303: determining the current location of the electronic device according to the positioning beacon information obtained by the Bluetooth positioning circuit.

For the specific implementation process and principles of the foregoing steps 301-303, reference may be made to the detailed description of the foregoing embodiment, which will not be repeated here.

Step 304: when a plurality of sets of positioning beacon information continuously obtained by the Bluetooth positioning circuit within a first preset time period are all the same, and determining that the electronic device is in a stationary state.

Or step 305: determining that displacement of the electronic device in the first preset time period is less than or equal to a displacement threshold according to the positioning beacon information, and determining that the electronic device is in the stationary state.

In the embodiments of the present disclosure, since the electronic device is in the motion state, in order to further reduce the power consumption of the electronic device, the Bluetooth positioning circuit can be turned off.

Specifically, it can be determined whether the electronic device is switched from a motion state to a stationary state according to the plurality of sets of positioning beacon information continuously obtained by the Bluetooth positioning circuit within the first preset time period. Or it is determined whether the electronic device is switched from the motion state to the stationary state according to the displacement of the electronic device in the first preset time period.

Specifically, if the plurality of sets of positioning beacon information continuously obtained by the Bluetooth positioning circuit in the first preset time period are all the same, or it is determined that the displacement of the electronic device in the first preset time period is less than or equal to the displacement threshold according to each positioning beacon information, it can be determined that the electronic device is in a stationary state.

It should be noted that in actual use, the duration of the first preset time period can be determined according to actual needs, for example, it can be 10 seconds, 1 minute, etc., which is not limited in the embodiment of the present disclosure.

Step 306: turning off the Bluetooth positioning circuit and turning on the sensor in the electronic device after the first preset time period.

In the embodiments of the present disclosure, if it is determined that the electronic device is currently in a stationary state, the sensor in the electronic device can be turned on (that is, the power supply loop of the control sensor is connected) to use the sensor to detect the state of the electronic device; and the Bluetooth positioning circuit is turned off (that is, the power supply loop of the Bluetooth positioning circuit is controlled to be disconnected), so that when the electronic device is in a stationary state, the scanning of the positioning beacon by the Bluetooth positioning circuit is suspended to reduce the power consumption of the electronic device. At this time, the first preset time period is zero.

It should be noted that after the sensor is turned on, the sensor can be kept in the on state at the same time as the Bluetooth positioning circuit for a short period of time (that is, the first preset time period is not zero), and when it is determined that the electronic device is continuously in a stationary state, the Bluetooth positioning circuit is turned off to prevent determining wrongly and turning on and off the Bluetooth positioning circuit frequently. For example, the sensor and Bluetooth positioning circuit can be kept turned on at the same time within 2 seconds after turning on the sensor. After 2 seconds, if it is determined that the electronic device is still in the stationary state according to the output value of the sensor and/or the positioning beacon information obtained by the Bluetooth positioning circuit, the Bluetooth positioning circuit can be turned off, which not only saves power consumption, but also avoids determining of the state of the electronic device wrongly.

The indoor positioning method provided by the embodiments of the present disclosure determines the current state of the electronic device according to the current speed parameters of the sensor, and when it is determined that the electronic device is currently in a motion state, the Bluetooth positioning circuit in the electronic device is turned on, and then the current location of the electronic device is determined according to positioning beacon information determined by the Bluetooth positioning circuit, and then when it is determined that the electronic device is in a stationary state, the Bluetooth positioning circuit is turned off and the sensor is turned on. Therefore, by turning off the Bluetooth positioning circuit when it is determined that the electronic device is in a stationary state, the power consumption of the Bluetooth positioning circuit is reduced, and the standby time of the electronic device is improved.

In order to implement the above-mentioned embodiments, the present disclosure also proposes an electronic device 400.

Figure 4:
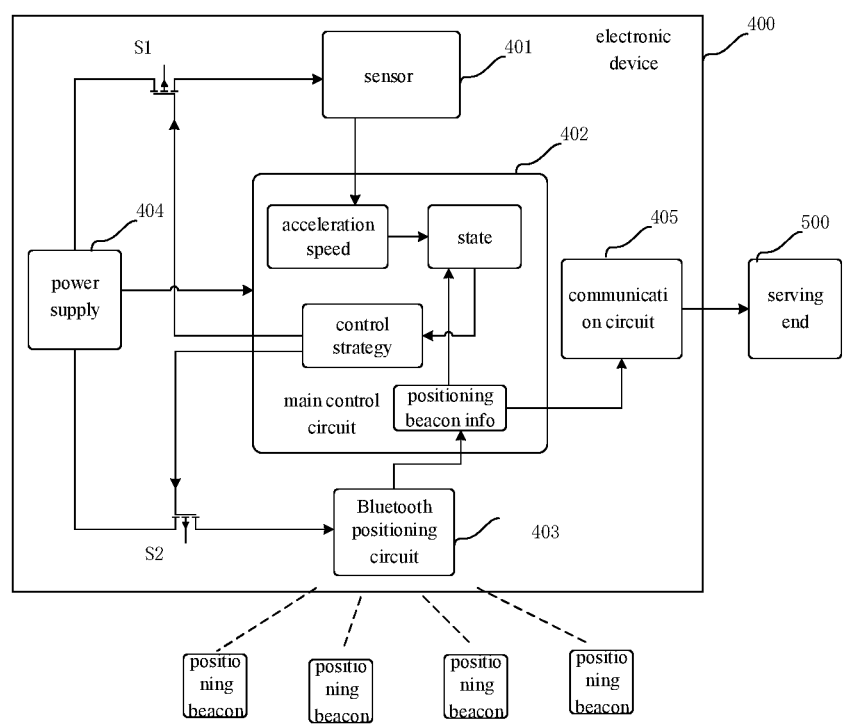
FIG. 4 is a schematic structural diagram of an electronic device provided by an embodiment of the present disclosure.

As shown in FIG. 4, the electronic device 400 includes: a sensor 401, a main control circuit 402, and a Bluetooth positioning circuit 403.

The sensor 401 is used to determine a current speed parameter of the electronic device 400.

The main control circuit 402 is used to determine a current state of the electronic device 400 according to the current speed parameter; if it is determined that the electronic device 400 is currently in a motion state, the Bluetooth positioning circuit 403 is turned on; and the current location of the electronic device 400 is determined according to the positioning beacon information obtained by the Bluetooth positioning circuit 403.

Optionally, the main control circuit 402 is further configured to: after the Bluetooth positioning circuit is turned on, if a plurality of sets of positioning beacon information continuously obtained by the Bluetooth positioning circuit within a first preset time period are all the same, or it is determined that the displacement of the electronic device in the first preset time period is less than or equal to the displacement threshold according to each positioning beacon information, and determine that electronic device is in a stationary state; and turn off the Bluetooth positioning circuit after the first preset time period.

Optionally, the main control circuit 402 is further configured to: turn on the sensor after turning off the Bluetooth positioning circuit after the first preset time period.

Optionally, the electronic device 400 further includes a power supply 404, wherein the main control circuit 402 is further configured to connect the power supply loop of the sensor by controlling the Bluetooth positioning circuit to be connected to the power supply.

Optionally, the electronic device 400 further includes a power supply, wherein the main control circuit 402 is further configured to: after turning on the Bluetooth positioning circuit for a second preset time period, disconnect the power supply loop of the sensor by disconnecting the sensor from the power supply.

Optionally, the main control circuit 402 is further configured to: if any two sets of positioning beacon information in a plurality of sets of positioning beacon information continuously obtained by the Bluetooth positioning circuit within the second preset time period have at least one different positioning beacon information or it is determined that the displacement of the electronic device in the second preset time period is greater than a displacement threshold according to each positioning beacon information, determine that the electronic device is in a motion state, wherein each set of positioning beacon information includes a plurality of positioning beacon information, the power supply loop of the sensor is disconnected.

Optionally, the positioning beacon information includes signal strength; the main control circuit 402 is further configured to: select N reference positioning beacon information from the positioning beacon information according to the signal strength in the positioning beacon information obtained by the Bluetooth positioning circuit, N is a positive integer.

Optionally, the main control circuit 402 is further configured to: sort the positioning beacon information in descending order according to the signal strength in each positioning beacon information obtained by the Bluetooth positioning circuit; determine the first N positioning beacon information as the reference positioning beacon information.

Optionally, the positioning beacon information further includes a beacon identifier, and the main control circuit 402 is further configured to: determine a current relative position between the electronic device and the first N reference positioning beacons according to the beacon identifiers and signal strength in the first N reference positioning beacon information; and determine the current location of the electronic device according to the current relative position between the electronic device and the first N reference positioning beacons and indoor setting positions of the first N reference positioning beacons.

Optionally, the electronic device 400 further includes a communication circuit 405, wherein the positioning beacon information further includes a beacon identifier; the main control circuit 402 is also used to send the beacon identifiers and signal strength in the first N reference positioning beacon information to the serving end 500 so that the serving end 500 can determine the current location of the electronic device.

In some embodiments, as shown in FIG. 4, the electronic device 400 includes a sensor 401, a main control circuit 402, a Bluetooth positioning circuit 403, a power supply 404, and a communication circuit 405.

The sensor 401 may be an acceleration sensor or a gyroscope, etc., and is used to obtain information such as acceleration and speed of the electronic device. The power consumption of the accelerometer is generally on the order of uA, and the power consumption of the Bluetooth positioning circuit 403 during scanning is generally on the order of mA. Therefore, if the electronic device is in the stationary state, the power consumption of the sensor 401 for measurement will be much smaller than power consumption of the Bluetooth positioning circuit 403 for scanning.

The main control circuit 402 mainly completes the functions of obtaining the speed parameter of the sensor 401, the realization of the state algorithm of the electronic device, the generation of a low power consumption control strategy, and the obtaining and upload of positioning beacon information. The main control circuit may be a microcontroller unit MCU. The main control circuit detects the acceleration, speed and other speed parameters of the acceleration sensor, and determines the current state of the electronic device (motion or stationary), or determines the current location of the electronic device according to the positioning beacon information obtained by the Bluetooth positioning circuit, after that, according to the current state of the electronic device, an indication is given whether the Bluetooth positioning circuit and the sensor are working, thereby generating a low power consumption control strategy, and then controlling the power supply of the Bluetooth positioning circuit and the sensor to reduce power consumption. In some embodiments, in the positioning state, the MCU may send the positioning beacon information (including the signal identifier and signal strength of the positioning beacon) obtained by the Bluetooth positioning circuit to the serving end through the communication circuit 405 to complete the entire positioning process.

The Bluetooth positioning circuit 403 mainly completes the obtaining of positioning beacon information. The Bluetooth positioning circuit 403 obtains positioning beacon information by scanning a positioning beacon (beacon for short), and the positioning beacon information may include the MAC address of the Beacon and the corresponding RSSI. In order to reduce power consumption, the Bluetooth Low Energy (BLE) is applied for the Bluetooth positioning circuit 403.

The power supply 404 supplies power to the main control circuit, Bluetooth positioning circuit, and communication circuit in the electronic device. In some embodiments, the power supply to the sensor and the Bluetooth positioning circuit is controlled by the main control circuit MCU.

The communication circuit 405 is used to upload the obtained positioning beacon information to the serving end. The communication circuit 405 can be implemented by LoRa, FSK or other wireless technologies. The serving end 500 is mainly responsible for data processing and the management of the electronic device, and the location of the electronic device is calculated based on the positioning beacon information and the stored GIS map containing the MAC address and location information of the Beacon.

Figure 5:
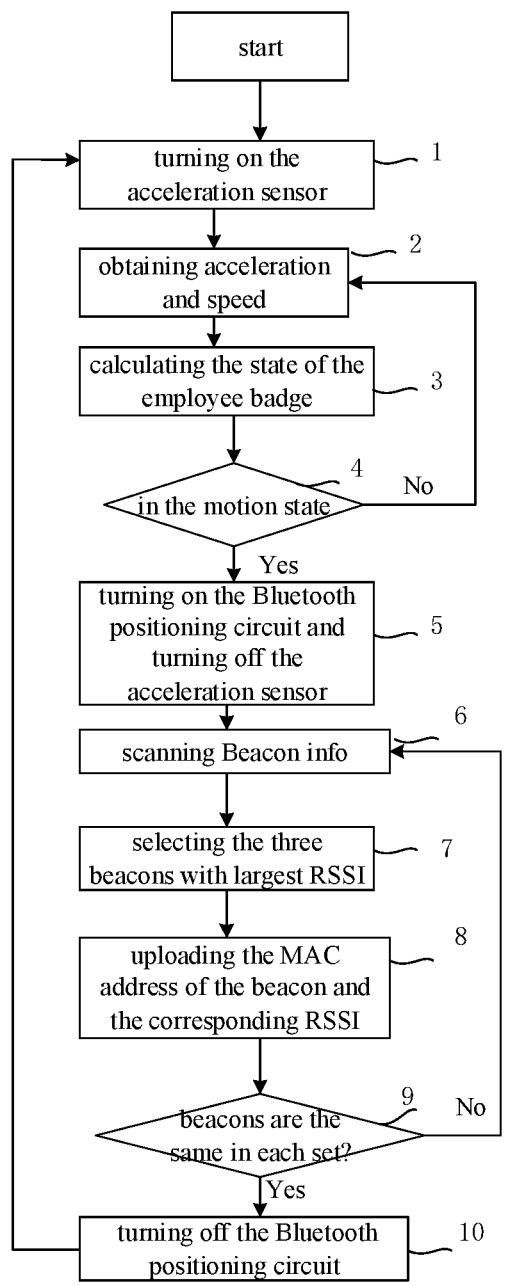
FIG. 5 is a schematic diagram of a specific example of an indoor positioning method in an embodiment of the present disclosure.

The indoor positioning method in the embodiment of the present disclosure will be described below with reference to a specific example. In this example, the electronic device is an employee badge. As shown in FIG. 5, assuming in an initial state, the employee badge is in a stationary state. The stationary state here refers to the small displacement of the employee badge within a certain period of time, not a completely immobile state. At this time, the power switch S1 of the acceleration sensor (see FIG. 4) is turned off, and the indoor positioning method of the present disclosure may include the following steps.

Step 1. turning on the switch S1 corresponding to the acceleration sensor.

Step 2: obtaining the speed parameter information such as acceleration and speed of the employee badge.

Step 3: calculating the state of the employee badge according to the speed parameter information such as acceleration and speed obtained in step 2.

Step 4. determining that the employee badge is in the motion state.

The MCU obtains speed parameter information such as acceleration and speed of the employee badge from the acceleration sensor, and calculates whether the employee badge is in a motion state according to the speed parameter information.

If yes, go to step 5, if not, go back to step 2.

Step 5. turning on the Bluetooth positioning circuit and turning off the acceleration sensor at the same time.

If it is found that the acceleration of the employee badge changes significantly, that is, the employee badge changes from a stationary state to a motion state, the MCU needs to turn on the Bluetooth positioning circuit for positioning, that is, the switch S2 is turned off.

Step 6. scanning, by the Bluetooth positioning circuit, the surrounding Beacon.

The Bluetooth positioning circuit is turned on and starts to scan the surrounding Beacon to obtain the positioning beacon information of the Beacon. At the same time, switch S1 is turned on and the acceleration sensor is turned off.

Step 7: according to the obtained positioning beacon information of the Beacon, selecting the first three beacons in descending order of signal strength (that is, the RSSI in ascending order, when the signal strength is the largest, the RSSI is the smallest) by RSSI as the positioning beacons.

Step 8. uploading the MAC address of the positioning beacon and the corresponding RSSI to the PC serving end through the communication circuit.

Step 9. determining whether the obtained positioning beacons are the same in each set according to the timing of the timer or the number of scanning (such as 10 times). Here, each set of positioning beacons may only include the first 3 beacons sorted in descending order of signal strength.

If yes, the employee badge is considered to be in a stationary state, and perform step 10; if not, the employee badge is considered to be still in a motion state, and return to step 6.

Step 10. turning off the Bluetooth positioning circuit and returning to step 1.

Here, if the Bluetooth positioning circuit scans the same Beacon for a long time, it is considered that the badge employee badge be switched to a stationary state, and the MCU needs to turn off the Bluetooth positioning circuit and turn on the acceleration sensor to reduce power consumption.

In some embodiments, when the employee badge is switched from the motion state to the stationary state, the acceleration sensor and the Bluetooth positioning circuit can be turned on at the same time in a short time, so that both can determine the state of the employee badge, according to the detection results thereof, the state of the employee badge can be accurately determined, so as to avoid determining the state of the employee badge wrongly.

In some embodiments, the sleep time of the MCU can also be increased, that is, the MCU can sleep when it is idle, so as to further reduce the power consumption of the employee badge.

Figure 6:
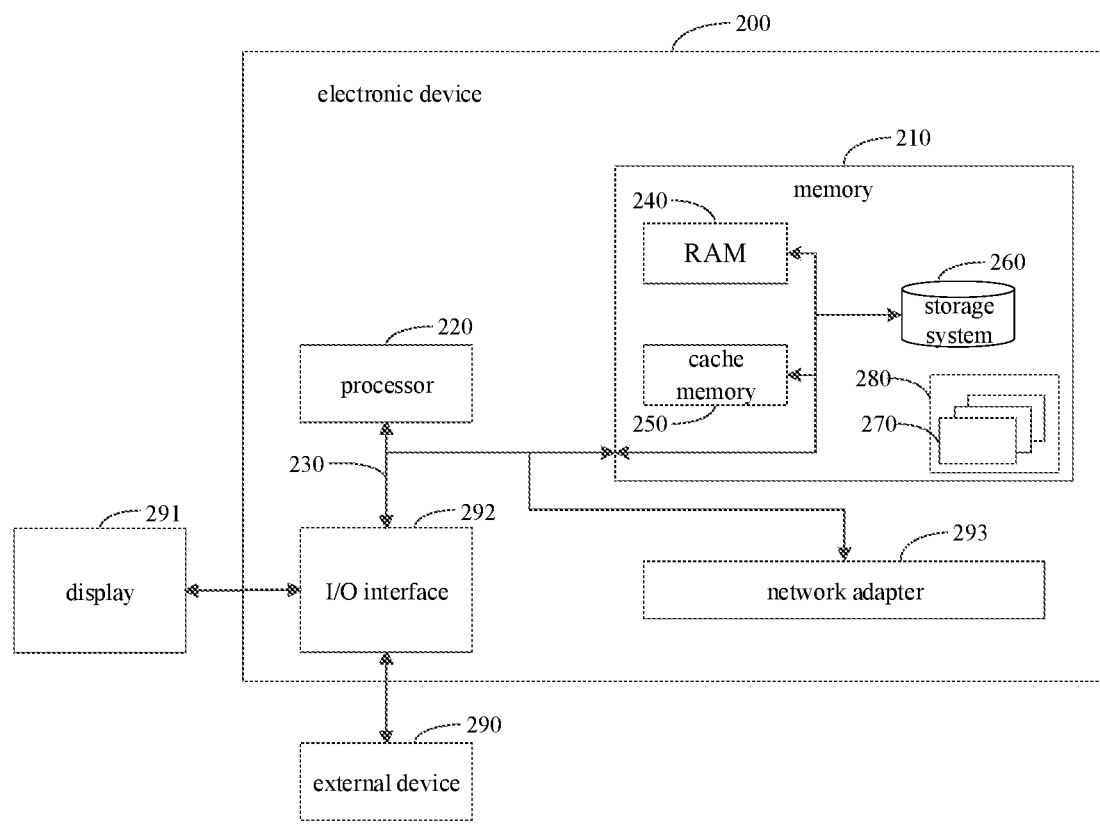
FIG. 6 is a schematic structural diagram of an electronic device provided by an embodiment of the present disclosure.

FIG. 6 is a schematic structural diagram of an electronic device according to an embodiment of the disclosure.

As shown in FIG. 6, the above-mentioned electronic device 200 includes: a memory 210 and a processor 220, a bus 230 connecting different components (including the memory 210 and the processor 220), the memory 210 stores a computer program, when the processor 220 executes the computer program, the indoor positioning method described in the embodiment of the present disclosure is implemented.

The bus 230 represents one or more of several types of bus structures, including a memory bus or a memory controller, a peripheral bus, a graphics acceleration port, a processor, or a local bus using any bus structure among a plurality of bus structures. For example, these architectures include but are not limited to industry standard architecture (ISA) bus, microchannel architecture (MAC) bus, enhanced ISA bus, Video Electronics Standards Association (VESA) local bus, and peripheral component interconnection (PCI) bus.

The electronic device 200 typically includes a variety of computer-readable medium. These medium may be any available medium that can be accessed by the electronic device 200, including transitory and non-transitory medium, removable and non-removable medium.

The memory 210 may also include a computer system readable medium in the form of transitory memory, such as random access memory (RAM) 240 and/or cache memory 250. The electronic device 200 may further include other removable/non-removable, transitory/non-transitory computer system storage medium. For example only, the storage system 260 may be used to read and write non-removable, non-transitory magnetic medium (not shown in FIG. 4, which is generally referred to as a "hard drive"). Although not shown in FIG. 4, a disk drive for reading and writing to removable non-transitory disks (such as "floppy disks"), and an optical drive for reading and writing to removable non-transitory optical disks (such as CD-ROM, DVD-ROM) can be provided. In these cases, each drive may be connected to the bus 230 through one or more data medium interfaces. The memory 210 may include at least one program product, and the program product has a set (for example, at least one) program modules configured to perform the functions of the various embodiments of the present disclosure.

A program/application tool 280 having a set of (at least one) program module 270 may be stored in, for example, the memory 210. Such program module 270 includes, but is not limited to, an operating system, one or more application programs, and other programs modules and program data, each of these examples or some combination may be implemented in a network environment. The program module 270 generally executes the functions and/or methods in the embodiments described in the present disclosure.

The electronic device 200 may also communicate with one or more external devices 290 (such as a keyboard, pointing device, display 291, etc.), and may also communicate with one or more devices that enable a user to interact with the electronic device 200, and/or communicate with any device (such as a network card, modem, etc.) that enables the electronic device 200 to communicate with one or more other computing devices. Such communication can be performed through an input/output (I/O) interface 292. In addition, the electronic device 200 may also communicate with one or more networks (for example, a local area network (LAN), a wide area network (WAN), and/or a public network, such as the Internet) through the network adapter 293. As shown in the figure, the network adapter 293 communicates with other modules of the electronic device 200 through the bus 230. It should be understood that although it is not shown in the figure, other hardware and/or software modules can be used in conjunction with the electronic device 200, including but not limited to: microcode, device drivers, redundant processing units, external disk drive arrays, RAID systems, tape drives and data backup storage system, etc.

The processor 220 executes various functional applications and data processing by running programs stored in the memory 210.

It should be noted that, the implementation process and technical principle of the electronic device of this embodiment refer to the foregoing explanation of the indoor positioning method of the embodiment of the present disclosure, which will not be repeated here.

The electronic device provided by the embodiments of the present disclosure can execute the indoor positioning method as described above, by determining the current state of the electronic device according to the current speed parameters of the sensor, and when it is determined that the electronic device is currently in the motion state, the Bluetooth positioning circuit of the electronic device is turned on, then the current location of the electronic device is determined according to the positioning beacon information obtained by the Bluetooth positioning circuit. Thus, by turning on the Bluetooth positioning circuit to scan the positioning beacon only when the electronic device is in a motion state, the power consumption of the Bluetooth positioning circuit is reduced and the standby time of the electronic device is improved.

In order to implement the above-mentioned embodiments, the present disclosure also proposes a computer-readable storage medium.

The computer-readable storage medium has a computer program stored thereon, and when the program is executed by a processor, the indoor positioning method described in the embodiment of the present disclosure is realized.

In order to implement the above-mentioned embodiments, another embodiment of the present disclosure provides a computer program, which is executed by a processor to implement the indoor positioning method described in the embodiments of the present disclosure.

In an optional implementation, this embodiment may adopt any combination of one or more computer-readable medium. The computer-readable medium may be a computer-readable signal medium or a computer-readable storage medium. The computer-readable storage medium may be, for example, but not limited to, an electrical, magnetic, optical, electromagnetic, infrared, or semiconductor system, device, or device, or a combination thereof. More specific examples (non-exhaustive list) of computer-readable storage media include: electrical connections with one or more wires, portable computer disks, hard disks, random access memory (RAM), read-only memory (ROM), Erasable programmable read only memory (EPROM or flash memory), optical fiber, portable compact disk read only memory (CD-ROM), optical storage device, magnetic storage device, or any suitable combination thereof. In the present disclosure, the computer-readable storage medium can be any tangible medium that contains or stores a program, and the program can be used by or in combination with an instruction execution system, apparatus, or device.

The computer-readable signal medium may include a data signal propagated in baseband or as a part of a carrier, and computer-readable program code is carried in the data signal. This propagated data signal can take many forms, including, but not limited to, electromagnetic signals, optical signals, or any suitable combination thereof. The computer-readable signal medium may also be any computer-readable medium other than a computer-readable storage medium. The computer-readable medium may send, propagate, or transmit the program for use by or in combination with the instruction execution system, apparatus, or device.

The program code contained on the computer-readable medium can be transmitted by any suitable medium, including, but not limited to, wireless, wire, optical cable, RF, etc., or any suitable combination thereof.

The computer program code used to perform the operations of the present disclosure can be written in one or more programming languages or a combination thereof. The programming languages include object-oriented programming languages, such as Java, Smalltalk, C++, and conventional procedural programming language, such as "C" language or similar programming language. The program code can be completely executed on the electronic device, partly executed on the electronic device, executed as an independent software package, partly executed on the electronic device and partly executed on the remote electronic device, or completely executed on the remote electronic device or executed on the serving end. In the case of remote electronic device, the remote electronic device can be connected to the consumer electronic equipment through any kind of network including a local area network (LAN) or a wide area network (WAN), or it can be connected to an external electronic device (for example, using the Internet through Internet services Provider).

Those skilled in the art will easily think of other embodiments of the present disclosure after considering the specification and practicing the disclosure applied here. The present disclosure is intended to cover any variations, uses, or adaptive changes of the present disclosure. These variations, uses, or adaptive changes follow the general principles of the present disclosure and include common knowledge or conventional technical means in the technical field not invented by the present disclosure. The description and the embodiments are only for illustration, and the scope and spirit of the present disclosure are defined by the claims.

The above-mentioned method disclosed in the present disclosure can be applied to a processor or implemented by a processor. The processor may be an integrated circuit chip with signal processing capabilities. In the implementation process, each step of the above method can be completed by an integrated logic circuit of hardware in the processor or instructions in the form of software. The above-mentioned processor can be a general-purpose processor, a digital signal processor (DSP), an application specific integrated circuit (ASIC), a ready-made programmable gate array (Field Programmable Gate Array, FPGA) or other programming logic devices, discrete gates or transistor logic devices, discrete hardware components. The methods, steps, and logical block diagrams disclosed in the present disclosure can be implemented or executed. The general-purpose processor may be a microprocessor or the processor may also be any conventional processor or the like. The steps of the method in the present disclosure may be directly embodied as being executed and completed by a hardware decoding processor, or executed and completed by a combination of hardware and software modules in the decoding processor. The software module can be located in a conventional storage medium in the art, such as random access memory, flash memory, read-only memory, programmable read-only memory, or electrically erasable programmable memory, registers. The storage medium is located in the memory, and the processor reads the information in the memory and completes the steps of the above method in combination with its hardware.

It can be understood that the embodiments described herein can be implemented by hardware, software, firmware, middleware, microcode, or a combination thereof. For hardware implementation, the processing unit can be implemented in one or more application specific integrated circuits (ASIC), digital signal processing (DSP), digital signal processing equipment (DSP Device, DSPD), programmable Logic device (PLD), Field-Programmable Gate Array (FPGA), general-purpose processors, controllers, microcontrollers, microprocessors, and other electronic units or the combination thereof for performing the functions described in this disclosure.

For software implementation, the technology of this disclosure can be implemented through modules (such as procedures, functions, etc.) that perform the functions of this disclosure. The software codes can be stored in the memory and executed by the processor. The memory can be implemented in the processor or external to the processor.

It should be understood that the present disclosure is not limited to the precise structure that has been described above and shown in the drawings, and various modifications and changes can be made without departing from the scope of the present disclosure. The scope of the present disclosure is only limited by the appended claims.

What is claimed is:

1. An indoor positioning method, comprising:
   determining a current state of an electronic device according to a current speed parameter of a sensor in the electronic device;
   if it is determined that the electronic device is currently in a motion state, turning on a Bluetooth positioning circuit in the electronic device;
   determining a current location of the electronic device according to positioning beacon information obtained by the Bluetooth positioning circuit,
   wherein after turning on the Bluetooth positioning circuit, the method further comprises:
   if a plurality of sets of positioning beacon information continuously obtained by the Bluetooth positioning circuit within a first preset time period are all the same, or it is determined that displacement of the electronic device in the first preset time period is less than or equal to a displacement threshold according to the positioning beacon information, determining that electronic device is in a stationary state; and
   turning off the Bluetooth positioning circuit after the first preset time period.

2. The method according to claim 1, wherein after turning off the Bluetooth positioning circuit after the first preset time period, the method further comprises: turning on the sensor in the electronic device.

3. The method according to claim 1, wherein the turning on the Bluetooth positioning circuit in the electronic device comprises: controlling to connect a power supply loop of the Bluetooth positioning circuit in the electronic device.

4. The method according to claim 1, further comprising:
   after turning on the Bluetooth positioning circuit for a second preset time period, disconnecting a power supply loop of the sensor.

5. The method according to claim 4, wherein after turning on the Bluetooth positioning circuit for a second preset time period, disconnecting a power supply loop of the sensor comprises:
   if any two sets of positioning beacon information in a plurality of sets of positioning beacon information continuously obtained by the Bluetooth positioning circuit within the second preset time period have at least one different positioning beacon information or it is determined that displacement of the electronic device in the second preset time period is greater than a displacement threshold according to the positioning beacon information, determining that the electronic device is in a motion state, wherein each set of positioning beacon information includes a plurality of positioning beacon information; and
   disconnecting the power supply loop of the sensor.

6. The method according to claim 1, wherein the first preset time period and/or the second preset time period are zero.

7. The method according to claim 1, wherein the positioning beacon information includes signal strength;
   before determining the current location of the electronic device according to the positioning beacon information obtained by the Bluetooth positioning circuit, the method further comprises:
   selecting N reference positioning beacon information from the positioning beacon information according to the signal strength in the positioning beacon information obtained by the Bluetooth positioning circuit, N being a positive integer.

8. The method according to claim 7, wherein the selecting N reference positioning beacon information from the positioning beacon information according to the signal strength in the positioning beacon information obtained by the Bluetooth positioning circuit comprises:
   sorting the positioning beacon information in descending order according to the signal strength in the positioning beacon information obtained by the Bluetooth positioning circuit;
   determining first N positioning beacon information as the reference positioning beacon information.

9. The method according to claim 8, wherein the positioning beacon information further includes a beacon identifier,
   the determining the current location of the electronic device according to the positioning beacon information obtained by the Bluetooth positioning circuit comprises:
   determining a current relative position between the electronic device and first N reference positioning beacons according to the beacon identifiers and signal strength in the first N reference positioning beacon information; and
   determining the current location of the electronic device according to the current relative position between the electronic device and the first N reference positioning beacons and indoor setting positions of the first N reference positioning beacons.

10. The method according to claim 8, wherein the positioning beacon information further includes a beacon identifier;
    the determining the current location of the electronic device according to the positioning beacon information obtained by the Bluetooth positioning circuit comprises:

sending the beacon identifiers and signal strength in the first N reference positioning beacon information to a serving end so that the serving end determines the current location of the electronic device.

11. An electronic device, comprising: a sensor, a main control circuit and a Bluetooth positioning circuit, wherein
the sensor is configured to determine a current speed parameter of the electronic device;
the main control circuit is configured to determine a current state of the electronic device according to the current speed parameter; if it is determined that the electronic device is currently in a motion state, the Bluetooth positioning circuit is turned on; and the current location of the electronic device is determined according to positioning beacon information obtained by the Bluetooth positioning circuit,
wherein the main control circuit is further configured to:
after the Bluetooth positioning circuit is turned on,
if a plurality of sets of positioning beacon information continuously obtained by the Bluetooth positioning circuit within a first preset time period are all the same, or it is determined that displacement of the electronic device in the first preset time period is less than or equal to a displacement threshold according to the positioning beacon information, determine that electronic device is in a stationary state; and
turn off the Bluetooth positioning circuit after the first preset time period.

12. The electronic device according to claim 11, wherein the main control circuit is further configured to:
turn on the sensor after turning off the Bluetooth positioning circuit after the first preset time period.

13. The electronic device according to claim 11, further comprising a power supply, wherein the main control circuit is further configured to connect a power supply loop of the sensor by controlling the Bluetooth positioning circuit to be connected to the power supply.

14. The electronic device according to claim 11, further comprising a power supply, wherein the main control circuit is further configured to: after turning on the Bluetooth positioning circuit for a second preset time period, disconnect the power supply loop of the sensor by disconnecting the sensor from the power supply.

15. The electronic device according to claim 14, wherein the main control circuit is further configured to:
if any two sets of positioning beacon information in a plurality of sets of positioning beacon information continuously obtained by the Bluetooth positioning circuit within the second preset time period have at least one different positioning beacon information or it is determined that displacement of the electronic device in the second preset time period is greater than a displacement threshold according to the positioning beacon information, determine that the electronic device is in a motion state, wherein each set of positioning beacon information includes a plurality of positioning beacon information,
disconnect the power supply loop of the sensor.

16. The electronic device according to claim 11, wherein the positioning beacon information includes signal strength; the main control circuit is further configured to:
select N reference positioning beacon information from the positioning beacon information according to the signal strength in the positioning beacon information obtained by the Bluetooth positioning circuit, N is a positive integer.

17. The electronic device according to claim 16, wherein the main control circuit is further configured to:
sort the positioning beacon information in descending order according to the signal strength in the positioning beacon information obtained by the Bluetooth positioning circuit;
determine first N positioning beacon information as the reference positioning beacon information.

18. The electronic device according to claim 17, wherein the positioning beacon information further includes a beacon identifier, and the main control circuit is further configured to:
determine a current relative position between the electronic device and first N reference positioning beacons according to the beacon identifiers and signal strength in the first N reference positioning beacon information; and
determine the current location of the electronic device according to the current relative position between the electronic device and the first N reference positioning beacons and indoor setting positions of the first N reference positioning beacons; or
wherein the electronic device further comprises a communication circuit,
wherein the positioning beacon information further includes a beacon identifier;
the main control circuit is further configured send the beacon identifier and signal strength in the first N reference positioning beacon information to a serving end so that the serving end determines the current location of the electronic device.

19. An indoor positioning method, comprising:
determining a current state of an electronic device according to a current speed parameter of a sensor in the electronic device;
if it is determined that the electronic device is currently in a motion state, turning on a Bluetooth positioning circuit in the electronic device;
determining a current location of the electronic device according to positioning beacon information obtained by the Bluetooth positioning circuit,
after turning on the Bluetooth positioning circuit for a second preset time period, disconnecting a power supply loop of the sensor.

* * * * *